United States Patent Office 3,794,617
Patented Feb. 26, 1974

---

3,794,617
COPOLYESTER FIBER COMPOSITIONS HAVING IMPROVED FLAME RETARDANT PROPERTIES
Harold Eugene Mains, William Leo O'Brien, H. Fred Oehlschlaeger, Hubert Joseph Sharkey, and Robert Elwood Vail, Jr., Cincinnati, Ohio, assignors to Emery Industries, Inc., Cincinnati, Ohio
No Drawing. Filed Mar. 15, 1972, Ser. No. 235,041
Int. Cl. C08g 17/08
U.S. Cl. 260—47 C
14 Claims

ABSTRACT OF THE DISCLOSURE

Fiber-forming copolyesters having improved color and heat stability in addition to excellent flame retardant properties are obtained when brominated diols, such as 2,2-bis[3,5 - dibromo-4-(2-hydroxyethoxy)phenyl] propane, are incorporated therein.

BACKGROUND OF THE INVENTION

The use of reactive intermediates to impart fire-retardant properties to polyesters is known. These reactive intermediates are generally halogenated compounds containing suitable functionality which enables them to react with the other reactants or polymer intermediates during the polyester formation. Halogenated compounds mentioned in the art for this purpose include tetrachlorophthalic anhydride, tetrabromophthalic anhydride, chlorendic anhydride, 2,2-bis-(bromoethyl)propane-1,3-diol, the condensation product of hexachlorocyclopentadiene and tetrahydrophthalic anhydride, and adducts of ethylene oxide with tetrabromobisphenol A or tetrachlorobisphenol A.

While there are certain advantages inherent in the use of halogenated chemical intermediates (as opposed to various chemical additives which do not become an integral part of the polyester as intermediates do) to impart flame retardance, the use of reactive intermediates for that purpose has been limited to polyester resin applications due to the comparative instability of these compounds when used at the high temperatures required for polyester fiber manufacture. Polyester resins in which halogenated chemical intermediates have been used in the past as flame retardants have been unsaturated polyesters prepared in large part from such unsaturated acids such as maleic acid or maleic anhydride with aromatic polybasic acids and various polyols. These resins after initial preparation are crosslinked to provide thermosetting resins useful for molding and coatings. In the preparation of unsaturated polyester resins the reaction temperatures seldom exceed about 200° C. whereas temperatures in excess of about 260° C. and often as high as 320° C. are employed in the preparation of fiber-forming polyesters. These high temperatures are necessary to achieve a high degree of polymerization and maintain the polyester in a molten state. Past efforts to use halogenated intermediates, particularly brominated compounds, in polyesters prepared at such high temperatures have failed because the halogen compounds generally found useful as flame retardants decompose under such heat conditions. Such decomposition has a serious adverse effect on the physical properties of the polymer, for example the strength of the resin is drastically reduced and it becomes badly discolored. Also, breakdown of the halogen, especially bromine, compounds leaves the polyester fiber with virtually no effective flame retardance.

References which deal with the use of reactive intermediates include U.S. Pat. 2,902,518 which teaches the use of 2,2'-[isopropylidenebis(2,6-dichloro-p-phenylene)] dialkanols as reactants for polyesters to impart slow-burning characteristics. The reactive compositions are limited to chlorinated materials and their only use is in unsaturated polyester resins. Schneider et al. in their article "Fire-Retardant Unsaturated Polyesters" (Ind. Eng. Chem. Prod. Res. Develop., Vol. 9, No. 4, 1970, pages 559–563) also show the use of adducts of alkylene oxides with tetrabromobisphenol A and tetrachlorobisphenol A as reactive intermediates in the preparation of unsaturated polyesters. In U.S. Pat. 3,477,989 Zorn et al. show the preparation of copolyesters useful for the preparation of fibers, films and molded goods obtained by the condensation of (1) aromatic dicarboxylic acid, (2) glycol, (3) 2,5-dihydroxyterephthalic acid and (4) an aromatic diol of the general formula

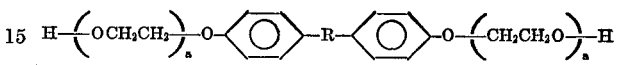

where R represents a direct linkage or bridge member and $a$ is a number from 1 to 10. They teach that the aromatic nuclei of the diol are preferably unsubstituted phenylene but that they may be substituted with one or two alkyl groups having one or two carbon atoms or one to four halogen atoms, notably chlorine. As a preferred diol Zorn et al. employ

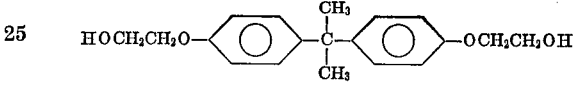

SUMMARY OF THE INVENTION

We have now made a truly surprising and unexpected discovery that certain brominated diols are useful reactive intermediates for the preparation of fiber-forming copolyesters and that the resulting copolyester fibers have excellent physical properties and heat stability and show little or no discoloration. The brominated diols herein employed can be incorporated into fiber-forming polyesters without undergoing decomposition during the final stages of the polymerization which are often conducted at temperatures of 270° C. to 300° C. or higher. This is especially surprising since the brominated diol by itself begins decomposing at about 250° C.

The polyesters of this invention are prepared by first preparing a polyester prepolymer with the brominated diol and then the prepolymer is furthur reacted at high temperatures to form the desired polyester fiber. When the brominated diol is incorporated into the polyester by first reacting it into a prepolymer the stability of the bromine is markedly enhanced and essentially no decomposition is observed at temperatures up to about 350° C.

The brominated diols of this invention have the formula

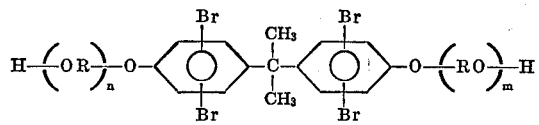

wherein R is a bivalent hydrocarbon radical containing from 2 to 6 carbon atoms and $n$ and $m$ are integers from to 1 to 10, preferably 1 to 3. 2,2-bis[3,5-dibromo-4-(2-hydroxyethoxy)phenyl] propane is an especially useful diol and represents the preferred embodiment of this invention. The copolyester will contain about 1 to about 20% by weight of the brominated diol.

DETAILED DESCRIPTION

The brominated diols useful in the present invention have the general formula

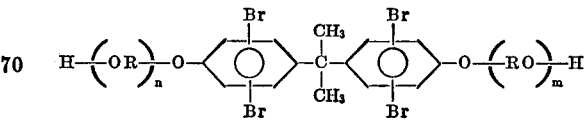

wherein R is a bivalent hydrocarbon radical containing from 2 to 6 carbon atoms and n and m are, independently, integers from about 1 to 10. These brominated diols are obtained by the alkoxylation of a brominated bisphenol A with the appropriate alkylene oxide. The reaction conditions employed and the molar ratio of reactants will determine the composition of the brominated diol. Especially useful are brominated diols where n and m are integers from 1 to 3, R is a

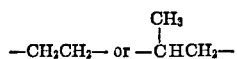

radical and the bromine is substituted in the positions ortho to the alkoxy groups, that is, in the 3 and 5 ring positions. Such compounds are derived from the reaction of 4,4′-isopropylidene(2,6-dibromophenol) with ethylene oxide or propylene oxide. An especially useful compound is 2,2-bis[3,5-dibromo-4-(2-hydroxyethoxy)phenyl] propane which has the structural formula

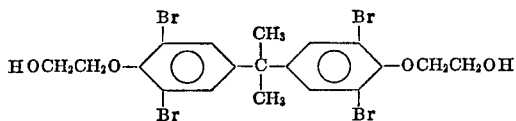

The brominated diols are prepared using known reaction techniques. For example, 2,2-bis[3,5-dibromo-4-(2-hydroxyethoxy)phenyl] propane is obtained by the ethoxylation of 4,4′-isopropylidene(2,6-dibromophenol), commonly referred to as tetrabromobisphenol A. The tetrabromobisphenol A (melting point 181–182° C.) may be prepared by the direct bromination of bisphenol A or obtained from commercial suppliers. The alkoxylation procedure generally consists of reacting the phenolic compound with the appropriate amount of alkylene oxide in the presence of a basic catalyst. The reaction may be conducted with or without a solvent, however, for the ethoxylation of tetrabromobisphenol A a solvent is usually preferred. Known basic catalysts such as amines and alkali metal hydroxides may be employed. Triethylenediamine is useful and gives rapid reaction rates. Sodium hydroxide is also used where longer reaction times are not objectionable.

Typically, the tetrabromobisphenol A is dissolved in a hydrocarbon solvent, such as xylene, and charged to the reactor with the catalyst. Catalyst amounts can be widely varied but will generally be present in amounts between about 0.05 and 0.2% by weight based on the tetrabromobisphenol A. The reaction mixture may be distilled to azeotropically remove any water from the system—water which may have been introduced with the catalyst or is present in the solvent. The charge is heated to 150° C., vented to 10 p.s.i.g., and the ethylene oxide carefully fed into the reactor until 50 p.s.i.g. is reached if the preferred compounds are to be prepared. Higher proportions of ethylene oxide may be charged, however, if different ethoxylates are desired. Reaction temperature and pressure are maintained until the reaction is completed. Reaction conditions may be varied depending on the catalyst used and the rate of reaction desired. For example, reaction temperatures may range from about 130° C. to about 170° C. or higher while pressures can be varied from about 25 up to about 75 p.s.i.g. or higher. The reaction is monitored by determing the amount of unreacted phenol in the reaction mixture. This is conveniently accomplished by titrating samples of the reaction mixture with a standardized base solution using phenolphthalein indicator. The reaction is terminated when the acid value of the reaction mixture is less than about one. If desired, the reaction mixture may be treated with activated charcoal or the product may be directly recrystallized from solution by cooling to about 20° C. with rapid agitation. The brominated diol crystals are recovered by filtration and after washing with xylene may be used, as such, after air-drying in an oven. Alternatively, the solvent may be removed under vacuum at a temperature above the melting point of the product. Chips or flakes may be obtained by such treatment.

The preferred brominated diol, 2,2-bis[3,5-dibromo-4-(2-hydroxyethoxy)phenyl]propane is a white crystalline material melting between 117–120° C. The material contains about 50 weight percent bromine, has a hydroxyl value of 170–175 and an acid value less than 1, preferably less than 0.5. The brominated diols useful for this invention preferably contain more than 95% of the dialkoxylated material, irrespective of the number of alkylene oxide units condensed. Conversely, no more than 5%, preferably no more than 3%, of the brominated diol product should contain aromatic hydroxyl functionality, i.e., phenol.

The brominated diols of this invention have been found to have particular utility in the modification of fiber-forming polyesters, since they are capable of yielding flame-retardant fibers having improved color and heat stability. The brominated diols are most advantageously used as reactive intermediates in the reaction of ethylene glycol and terephthalic acid for the formation of poly(ethylene terephthalate) copolyesters and in the reaction of 1,4-cyclohexanedimethanol with terephthalic acid for the preparation of poly(1,4-cyclohexylenedimethylene terephthalate) copolyesters. An alternative procedure for obtaining similar copolyesters would be to employ esters of terephthalic acid rather than terephthalic acid. Ester interchange processes of this type are widely employed preferably using dimethyl terephthalate with the glycol.

The brominated diols may be employed as reactive intermediates in the preparation of polyesters obtained from the reaction of glycols of the general formula

wherein x is an integer from about 2 to 10. Such glycols include ethylene glycol, which is a preferred glycol, 1,3-propanediol, 1,5 - pentanediol, 1,6 - hexanediol, 1,7-hepthane, 1,8-octanediol, 1,9-nonanediol, 1,10-decanediol or the like. These glycols and particularly the preferred glycols ethylene glycol and 1,4-cyclohexanedimethanol are reacted with dicarboxylic acids or suitable esters thereof, preferably terephthalic acid or dimethyl terephthalate, or other dibasic acids including isophthalic acid, adipic acid, sebacic acid, succinic acid, oxalic acid, glutaric acid, pimelic acid, suberic acid, azelaic acid and the like. In addition to being useful with polyesters derived from the more common diols and dicarboxylic acids the brominated diol may be used as a reactive intermediate with other reactants including glycerol, sorbitol, pentaerythritol, methoxypolyethylene, glycol, neopentyl glycol, monohydroxypivalate, trimethylolpropane, trimesic acid, p,p′-dicarboxydiphenylmethane, p,p′-dicarboxydiphenoxyethane, p-carboxyphenoxyacetic acid and the like.

The present invention is particularly directed to ethylene glycol/terephthalic acid/brominated diol copolyesters and 1,4-cyclohexanedimethanol/terephthalic acid/brominated diol copolyesters due to the excellent fiber-forming characteristics of these polymers and the improved heat stability and color characteristics of these copolyesters. The brominated diol is present in the copolyester compositions in an amount between about 1 to 20% by weight of the total composition. Especially useful copolyesters having excellent flame-retardant properties, color and heat stability are obtained when the brominated diol comprises from about 5 to 15 percent by weight of the total composition. When the brominated diol is incorporated into the polymer in the manner to be later described these superior and unexpected results will be obtained. In addition to the brominated diol small amounts of other monomers may also be incorporated to alter one or more of the properties of the copolyester. For example, small amounts of butanediol or isophthalic acid may be incorporated therein. Also to improve the disperse dyeability of the copolyester small amounts of dibasic acids such as adipic acid, azelaic acid or dimer acids may be used. Sulfonated isophthalic acid may be employed to improve the basic dyeing properties of the copolyester. In general, however, the amounts of these reactants should not exceed about 3 mol percent of the copolyester. Rather than modifying the copolyester in this manner it may be more advantageous to enhance the desired properties thereof by blending the copolyester with an amount of a suitable additive including other polyester or copolyester compositions.

To obtain useful copolyesters modified with the brominated diol the brominated reactive intermediate should first be reacted to form a prepolymer prior to being introduced into the later stages of the polymerization. The manufacture, whether batch, continuous or continuous-batch, should be conducted so that the brominated diol is reacted into the prepolymer prior to exposure to the reaction conditions encountered in the later fiber-forming stages of the reaction. Quite unexpectedly it has been observed that although the brominated diol has a decomposition temperature of about 250° C., if the brominated diol is reacted with the appropriate reactants under suitable conditions to form a prepolymer, the decomposition temperature is increased by more than 100° C. and the brominated diol will not decompose in the final stages of the process. When the brominated diol is not reacted in this manner but is added directly to a one-stage polymerization or to a polymerization which is in its final stages, decomposition results yielding highly discolored polymers having poor physical properties and poor fire-retardancy characteristics.

The significance of our discovery of the effectiveness of the brominated diols of this invention can better be appreciated when it is realized that other aromatic bromine-containing compounds which have been suggested for use as flame retardants such as tetrabromophthalic anhydride and ethoxylated tetrabromophthalic anhydride sold under the trade designation "Firemaster PHT4" do not function the same as the brominated diols of this invention. In fact innumerable other halogen containing functional materials have been tested with the brominated diols of this invention being the only ones found not wanting in some material respect. These other aromatic brominated compounds even when incorporated in the first stages of the reaction to form a prepolymer as with the brominated diol of this invention, decompose with accompanying discoloration and loss of physical properties. It was thus entirely unexpected that the brominated diol obtained by the ethoxylation of tetrabromobisphenol A would show the unique and superior flame retardance in fiber-forming copolyesters.

Conventional polymerization procedures for preparing fiber-forming polyesters may be employed and are useful for the present invention. Reaction conditions and catalyst used are those described in the art. The only limitation in the present process if heat stable, essentially colorless copolyesters are to be obtained with the brominated diol is that the brominated diol be charged to the polymerizer prior to that point in the reaction where the temperature is increased to about 245° C. This is conveniently accomplished by adding the brominated diol to the polymerizer with the diol and dicarboxylic acid or ester thereof at the outset of the reaction or at any point during the first stage of the reaction while the prepolymer is being formed. Essentially all the brominated diol should be reacted prior to exposure to the elevated temperatures encountered in the later stages of the reaction. In the preparation of poly (ethylene terephthalate), for example, the polymer may be prepared in two or more stages. Dimethyl terephthalate and ethylene glycol are charged to the polymerizer in a 1:2 molar ratio (excess ethylene glycol may be present) with a suitable catalyst such as a mixture of calcium acetate dihydrate and antimony trioxide. If desired the brominated diol may also be added to this reaction mixture which is then heated to about 200° C. to achieve prepolymer formation. Alternatively, the prepolymer may be formed in the absence of the brominated diol by reacting at about 200° C. The brominated diol will then be added to the reaction mixture so that it may react with the bis(hydroxyethyl)terephthalate prepolymer prior to raising the reaction temperature for the final stages of the polymerization. As noted above the brominated diol should be essentially completely incorporated into the prepolymer prior to exposure to temperatures of about 245° C. or higher. After incorporation of the brominated diol into the prepolymer, the reaction can be continued into the final stages for removal of the last traces of methanol and ethylene glycol in the ester-interchange stage where the molecular weight is increased to the fiber-forming range. Numerous modifications of this process are possible, including varying the reactants employed, the catalyst, the polymerization process, reaction temperature and pressure, as long as the brominated diol is incorporated into the prepolymer before the reaction temperature reaches about 245° C.

The following will illustrate the invention more fully, however, no limitation on the scope of the invention is intended. Copolyesters modified with brominated diol and having improved color and heat stability in addition to flame-retardant properties were prepared using several procedures. In one process bis(hydroxyethyl)terephthalate prepolymer was first prepared by reacting 600 grams dimethyl terephthalate and 423 grams ethylene glycol with 0.96 grams calcium acetate dihydrate catalyst. The reaction mixture was heated under nitrogen to about 220° C. until 250 mls. methanol were recovered. The bis(hydroxyethyl) terephthalate prepolymer was poured from the reactor, allowed to cool and ground in a blender for subsequent use.

40 grams of the above-prepared bis(hydroxyethyl) terephthalate prepolymer and 8 grams 2,2-bis[3,5-dibromo-4-(2 - hydroxyethoxy)phenyl]propane (melting point 117–120° C.) obtained by the epoxidation of 1 mol tetrabromobisphenol A with 2 mols ethylene glycol were charged to a reactor with 0.1 gram calcium acetate dihydrate and 0.01 gram antimony trioxide. The reaction mixture, maintained under an inert atmosphere of nitrogen, was heated to about 225° C. for about 20 minutes to remove the last traces of methanol before raising the reaction temperature to about 285° C. After about 10 minutes at 285° C. the pressure was reduced to 0.33 mm. by pulling a vacuum on the system and the reaction continued for about 3 hours. The copolyester (identified as Sample A) contained about 8 mol percent brominated diol and had good color. Using the bis(hydroxyethyl) terephthalate prepolymer and the following the same procedure other copolyesters were prepared which contained 6 mol percent brominated diol (Sample B), 4 mol percent brominated diol (Sample C) and 2 mol percent brominated diol (Sample D). Still another sample (E) contained no brominated diol. The so-prepared copolyesters were evaluated to determine melt point, decomposition temperature and oxygen index rating and the results are set forth below.

The temperature of decomposition was determined using thermal gravimetric analysis by heating a sample of the copolyester in a nitrogen atmosphere (70 ml. per minute) at a rate of 10° C. per minute. The oxygen index rating is based on the measurement of the minimum concentration of oxygen by volume in a gaseous mixture (oxygen+nitrogen) required to support combustion of a sample. Samples were prepared by treating 1 x 8 cm. fiber glass cloth strips with the copolyester. This was accomplished by placing the copolyester and fiber glass strip in a heavy aluminum foil mold and placing on a hot plate until the polyester was melted. Test specimens were then clamped in an upright position at the bottom of a vertical glass chimney and ignited at the upper end with a flame. An oxygen-nitrogen mixture of known composition was passed through the chimney. If the sample continued to burn for a specified time, the oxygen content in the mixture is reduced and the procedure repeated until the oxygen content of the mixture will no longer support the the combustion. The oxygen index rating is calculated as follows:

$$\text{Oxygen index} = \frac{(O_2 \text{ volume}) \times 100}{(O_2 \text{ volume}) \times (N_2 \text{ volume})}$$

| Sample | Melt point (° C.) | Initial decomposition temperature (° C.) | Oxygen index rating |
|---|---|---|---|
| A | 239 | 355 | 28 |
| B | 244 | 350 | 25 |
| C | 249 | 355 | 24 |
| D | 254 | 355 | 22.5 |
| E | 260 | 365 | 20 |

While melt points and decomposition temperatures of the modified copolyesters are somewhat less than the values obtained with the unmodified polyester (E) these values all fall within acceptable limits for useful copolyester fibers. The stability of the polyesters modified with the brominated diol were truly surprising since thermal gravimetric analysis of the brominated diol 2,2-bis[3,5-dibromo - 4 - (2 - hydroxyethoxy)phenyl] propane showed the compound to have an initial decomposition temperature of 250° C. and by the time 340° C. was reached 50% of the compound had decomposed. Fibers produced from these copolyesters had no objectionable discoloration. These copolyesters had excellent utility in fiber applications and the resulting compositions had good flame retardant properties as evidenced by the oxygen index ratings From the table it is seen that unmodified polyester burns in air whereas the addition of as little as 2 mol percent of the brominated diol increases the amount of oxygen required to support combustion of the material.

Additional copolyester samples are prepared in accordance with the method described in "Preparative Methods of Polymer Chemistry," W. R. Sorenson et al., Interscience Publishers, New York (1961). In these preparations the brominated diol, dimethyl terephthalate and ethylene glycol are added as a unit charge to the polymerizer and heated under nitrogen at 197° C. in the presence of a calcium acetate dihydrate-antimony trioxide catalyst system. The reaction mixture was then heated to an intermediate temperature (222° C.) for about 20 minutes before being raised to about 285° C. while pulling a vacuum on the system to complete the reaction. Copolyesters prepared in this manner have similar properties to the copolyesters described above. They have good color and heat stability and show much improved flame-retardancy over poly-(ethylene terephthalate) not containing brominated diol. Similar preparations are conducted to obtain poly(1,4-cyclohexylenedimethylene terephthalate) copolyesters having good color and heat stability at levels up to about 8 weight percent brominated diol.

Polyesters obtained by the present invention may be treated in accordance with procedures established for the preparation and treatment of polyester fibers. While the copolyesters of this invention may be used without further compounding, known additives such as stabilizers, lubricants, plasticizers, delusterants, dyes, pigments, antistatic agents and the like may be incorporated into the polyester. The copolyesters may also be blended with other polymer compositions compatible therewith including homopolymers, copolymers, block copolymers and the like. Additives may be incorporated into the fiber-forming polyester using conventional mixing equipment such as a Banbury mixer, revolving drum or sigma blade mixer and they generally do not require special processing or handling. They may be mixed with the polymer in dry form or dispersed or dissolved in suitable solvents for addition to the fiber-forming polymer. In some instances it may be advantageous to prepare a masterbatch of the various additives for blending with the copolyester. The incorporation of additives and modifying agents is most often accomplished by melt blending. In this way the additives are readily and uniformly dispersed in the polyester.

Fibers and filaments of the present polyester compositions are prepared using conventional procedures such as by melt extrusion and by spinning from solution. These fibers can be orientated by cold drawing and they can be heat set by heating the elongated fiber. These orientated fibers have excellent physical properties and may be employed in conventional applications. The fibers of this invention may be used in any state of aggregation, e.g., as monofilaments, flocks, yarns, tows, or cords, and they are readily knitted or woven. They may be used in textile applications by themselves or in blends containing about 25 to 65% by weight of the polyester and 75 to 35% by weight of another fiber such as cotton, nylon and other polyester. Extremely useful blends are obtained when the copolyesters are blended with cotton. Blends with fibers having elastic properties to obtain stretch fabrics may also be prepared. The present copolyesters find particular utility in wearing apparel, draperies and carpeting.

We claim:

1. A flame retardant polyester fiber-forming composition having improved color and heat stability comprising the condensation product of (1) a diol, (2) a dicarboxylic acid or ester of a dicarboxylic acid selected from the group consisting of terephthalic acid, isophthalic acid and saturated aliphatic dibasic acids containing 2 to 10 carbon atoms and (3) a brominated diol of the formula:

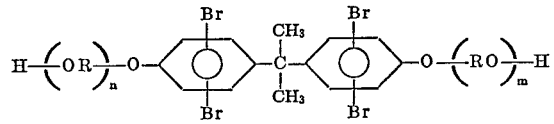

wherein R is a bivalent hydrocarbon radical containing from 2 to 6 carbon atoms and n and m are integers from 1 to 10; said brominated diol comprising about 1 to 20 weight percent of the copolyester composition.

2. The copolyester composition of claim 1 wherein R of the brominated diol is selected from the group consisting of

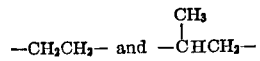

and the bromine atoms are positioned ortho to the alkoxyl groups.

3. The copolyester composition of claim 2 wherein the brominated diol is 2,2 - bis[3,5 - dibromo-4-(2-hydroxyethoxy)phenyl] propane and constitutes 5 to 15 percent by weight of the copolyester composition.

4. The copolyester composition of claim 1 wherein the diol is selected from the group of glycols having the formula

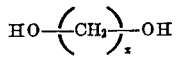

where $x$ is an integer from 2 to 10 and 1,4-cyclohexanedimethanol; the dicarboxylic acid or ester of a dicarboxylic acid is selected from the group consisting of terephthalic acid and dimethyl terephthalate; and R of the brominated diol is selected from the group consisting of —CH$_2$CH$_2$— and

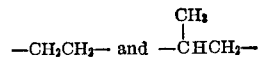

and the bromine substituents are attached ortho to the alkoxyl groups.

5. The copolyester composition of claim 4 wherein the diol is ethylene glycol, the dicarboxylic acid is terephthalic acid and the brominated diol is 2,2-bis[3,5-dibromo-4-(2-hydroxyethoxy) phenyl] propane and constitutes from 5 to 15 percent by weight of the copolyester composition.

6. The copolyester composition of claim 4 wherein the diol is ethylene glycol the dicarboxylic acid ester is dimethyl terephthalate, and the brominated diol is 2,2-bis-[3,5-dibromo-4-(2-hydroxyethoxy) phenyl] propane and constitutes from 5 to 15 percent by weight of the copolyester composition.

7. The copolyester composition of claim 4 wherein the diol is 1,4-cyclohexanedimethanol, dicarboxylic acid is terephthalic acid and the brominated diol is 2,2-bis[3,5-dibromo-4-(2-hydroxyethoxy) phenyl] propane and constitutes from 5 to 15 percent by weight of the copolyester composition.

8. The copolyester composition of claim 4 wherein the diol is 1,4-cyclohexanedimethanol, the dicarboxylic acid ester is dimethyl terephthalate, and the brominated diol is 2,2-bis[3,5-dibromo-4-(2-hydroxyethoxy) phenyl] propane and constitutes from 5 to 15 percent by weight of the copolyester composition.

9. A method for the preparation of flame retardant fiber-forming copolyesters having improved color and heat stability which comprises condensing (1) a diol and (2) a dicarboxylic acid or ester of a dicarboxylic acid selected from the group consisting of terephthalic acid, isophthalic acid and saturated aliphatic dibasic acids containing 2 to 10 carbon atoms, or a prepolymer of (1) and (2), with (3) a brominated diol of the formula:

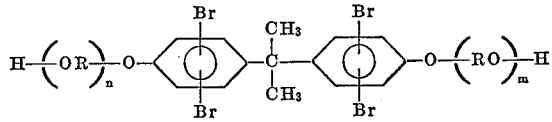

wherein R is a bivalent hydrocarbon radical containing from 2 to 6 carbon atoms and $n$ and $m$ are integers from 1 to 10 at a temperature below about 245° C. until essentially all the brominated diol is reacted and then increasing the temperature of the reaction above the melt point of the copolyester to complete the polymerizaion.

10. The method of claim 9 wherein the brominated diol has the formula:

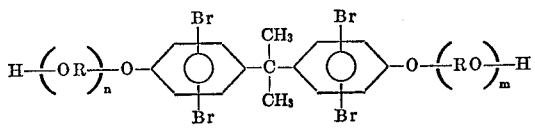

wherein R is a bivalent hydrocarbon radical containing from 2 to 6 carbon atoms and $n$ and $m$ are integers from 1 to 10, and said brominated diol constitutes about 1 to 20 weight percent of the fiber-forming copolyester composition.

11. The method of claim 1 wherein (1) is selected from the group consisting of glycols of the formula

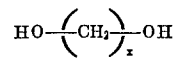

where $x$ is an integer from 2 to 10 and 1,4-cyclohexanedimethanol, (2) is selected from the group consisting of terephthalic acid and dimethyl terephthalate, and (3) is 2,2 - bis[3,5 - dibromo-4-(2-hydroxyethoxy) phenyl] propane.

12. The method of claim 11 wherein the brominated diol has a hydroxyl value of 170–175 and an acid value less than 1.

13. The method of claim 11 wherein ethylene glycol and dimethyl terephthalate or terephthalic acid are condensed with brominated diol at a temperature below the decomposition temperature of the brominated diol to form a prepolymer and the reaction temperature is then increased to 265° C. or higher to produce a fiber-forming copolyester containing about 5 to 15 weight percent brominated diol which copolyester shows essentially no decomposition at temperatures up to about 350° C.

14. The method of claim 11 wherein bis(hydroxyethyl) terephthalate prepolymer is condensed with brominated diol at a temperature below the decomposition temperature of the brominated diol and then the reaction temperature is increased to 265° C. or higher to produce a fiber-forming copolyester containing about 5 to 15 weight percent brominated diol which copolyester shows essentially no decomposition at temperatures up to about 350° C.

References Cited
UNITED STATES PATENTS

| | | | |
|---|---|---|---|
| 3,162,615 | 12/1964 | Bremmer | 260—47 |
| 2,762,789 | 9/1956 | Fisher et al. | 260—75 |
| 2,902,518 | 9/1959 | Hurdis et al. | 260—613 |
| 3,525,715 | 8/1970 | Hrach et al. | 260—47 |

LESTER L. LEE, Primary Examiner

U.S. Cl. X.R.

260—49, 61, DIG. 24